Patented Nov. 4, 1952

2,616,864

UNITED STATES PATENT OFFICE 2,616,864

PROCESS FOR MAKING THERMOPLASTIC COMPOSITIONS FROM RESINOUS POLYMERS OF MONOVINYL AROMATIC HYDROCARBONS AND BUTADIENE-STYRENE ELASTOMERS

Walter E. Donaldson, Midland County, and Alden W. Hanson, Midland, Mich., assignors to The Dow Chemical Company, Midland, Mich., a corporation of Delaware No Drawing. Application March 29, 1951, Serial No. 218,272

8 Claims. (Cl. 260—23.7)

1

This invention relates to the production of thermoplastic compositions made from resinous polymers of monovinyl aromatic hydrocarbons and rubbery copolymers of butadiene and styrene. It particularly concerns a process for making such compositions in a form having good mechanical properties and improved aging characteristics.

It is known that the mechanical properties of polystyrene can be improved by incorporating a small amount, e. g. from one to ten per cent by weight, of rubber therewith. Methods of making the compositions are well known. One such method consists in dissolving a rubber in monomeric styrene and heating the solution to polymerize the styrene. The copolymerized styrene-rubber mixture thus obtained is mechanically worked or masticated, e. g. by milling on heated compounding rolls, to intimately mix the components and form a homogeneous mass suitable for use as a molding composition. These compositions have been found useful for many applications involving usual compression or injection molding operations, and articles molded therefrom possess impact strength and per cent elongation values greater than those of similar articles made from polystyrene. However, it has been observed that the mechanical properties of the compositions become poorer upon aging and that the degradation of the properties is accelerated upon exposure to sunlight or ultraviolet light. This degradation of the mechanical properties, particularly the lowering of impact strength and per cent elongation values upon exposure to light, restricts greatly use of the compositions for many purposes.

It is an object of the invention to provide a process for making a thermoplastic composition from a hard resinous polymer of a monovinyl aromatic hydrocarbon, polyethylene and a rubbery copolymer of butadiene and styrene, which composition has desirable mechanical properties and good aging characteristics. Another object is to produce thermoplastic compositions suitable for molding which are mechanical mixtures composed principally of a resinous polymer of a monovinyl aromatic hydrocarbon, a rubbery copolymer of styrene and butadiene and polyethylene, which compositions can readily be molded by usual injection molding or extrusion operations. Still another object is to provide

2 a process for making a homogeneous composition from a polymerized monovinyl aromatic hydrocarbon, polyethylene and a rubbery copolymer of styrene and butadiene by simple and direct procedure. A further object is to produce thermoplastic compositions from polystyrene, a rubbery copolymer of butadiene and styrene and polyethylene, which compositions have satisfactory mechanical properties, and good aging characteristics. Other and related objects will become apparent from the following description of the invention.

According to the invention a resinous composition having desirable mechanical properties and good aging characteristics can readily be obtained by blending from 75 to 90 parts by weight of a resinous polymer of a monovinyl aromatic hydrocarbon, e. g. polystyrene, from 5 to 12 parts of a rubbery copolymer of butadiene and styrene, from 2 to 6 parts of a solid polymer of ethylene and from 3 to 7 parts of a liquid mixture of a polymerizable vinyl aromatic hydrocarbon and a drying oil such as linseed oil, tung oil, or dehydrated castor oil, into a homogeneous mass by mechanically working, or masticating, a mixture of the ingredients at a heat-plastifying temperature between 160° and 220° C. for a period of time of from 3 to 15 minutes to intimately mix the ingredients with each other and form a homogeneous composition.

It has been found that by mechanically working or masticating a mixture of the ingredients at a heat-plastifying temperature between 160° and 220° C., preferably from 170° to 190° C., in a suitable machine such as a "Banbury mixer," or an extruder such as that described in United States Patent 2,488,189, the components can readily be intimately blended with each other in a rapid and efficient manner to form a homogeneous composition in which the ingredients appear to be chemically combined.

Polystyrene having an average molecular weight of from 60,000 to 80,000 as determined by the well known Staudinger method, is the preferred polymerized monovinyl aromatic hydrocarbon to be employed in preparing the resinous compositions, but the resinous polymers and copolymers of other polymerizable monovinyl aromatic hydrocarbons such as para-methylstyrene, meta-ethylstyrene, para-isopropylstyrene, ar-dimethylstyrene, meta-methylstyrene, or para-ethylstyrene, or copolymers of any of these compounds with styrene may be used.

The rubbery copolymer of styrene and butadiene to be used should contain from 50 to 80 per cent, preferably from 70 to 80 per cent, by weight of combined butadiene. Examples of rubbery copolymers of styrene and butadiene which are suitable are the unvulcanized synthetic GRS type rubbers such as GRS X-274, a copolymer of about 23.5 per cent by weight of styrene and 76.5 per cent of butadiene, and GRS X-26, a copolymer of 29 per cent styrene and 71 per cent of butadiene.

The polymerized ethylene should be a normally solid polymer of ethylene having a mean molecular weight greater than about 6,000 and is used in amount, suitably of from 2 to 6 per cent by weight of the composition.

The liquid mixture of a polymerizable vinyl aromatic hydrocarbon and a drying oil is preferably a solution of a vinyl aromatic hydrocarbon such as styrene, ethylvinylbenzene, divinylbenzene, divinyl toluene, divinyl xylene, or ethyl-divinylbenzene, or mixtures of any of these compounds, and a drying oil having a high degree of unsaturation, e. g. linseed oil, dehydrated castor oil, or tung oil. The mixture of liquid polymerizable ingredients may contain one or more vinyl aromatic hydrocarbons and a drying oil as just mentioned, in any desired proportions, suitably in amounts of from 5 to 95 per cent by weight of the vinyl aromatic hydrocarbon and from 95 to 5 per cent of the drying oil. The liquid ingredients are preferably a mixture of from 10 to 25 per cent by weight of divinylbenzene, from 20 to 50 per cent of ethylvinylbenzene and from 25 to 70 per cent of linseed oil. Such liquid mixtures are soluble in, or at least partly soluble in, the polymeric components of the composition and soften or plasticize the same, and on polymerizing have the additional property of causing a bond between the dispersed polymeric components of the composition. Thus, the compositions do not exhibit aggregation of the ingredients, but possess the desirable mechanical properties of a copolymeric material and exhibit good aging characteristics. The compositions can readily be extruded to form articles having a smooth surface and a pleasing appearance.

In practice, the polymeric starting materials, suitably in granular form, and the liquid mixture of a polymerizable vinyl aromatic hydrocarbon and a drying oil, are blended together in any usual way, e. g. by tumbling the same in a closed container, to form a uniform dry-mix for convenience in handling. The mixture is fed into a plastics mixer, e. g. a "Banbury mixer," or an extruder, wherein it is heat-plastified and is masticated, or mechanically worked, into a uniform mass by specially designed rotors which knead, roll and tear the material, while at the same time at least a portion of the liquid ingredients are polymerized therein to form a homogeneous mass. In general, a homogeneous composition is usually obtained when a mixture of the ingredients is masticated at temperatures of from 160° to 220° C. over a period of time of from 3 to 15 minutes, although the heat-plastified mixture may be mechanically worked for somewhat longer periods of time. Prolonged milling or mechanical working of the heat-plastified mass should be avoided since excessive molecular break-down of the polymeric components may occur with resultant lowering of the mechanical properties of the composition.

After blending the ingredients into a heat-plastified homogeneous mass, the composition is cooled and is cut or ground to a granular form suitable for molding.

The following examples illustrate ways in which the principle of the invention has been applied, but are not to be construed as limiting the invention.

EXAMPLE 1

In each of a series of experiments, a molding grade polystyrene, a GRS type X-274 synthetic rubber (a copolymer of about 23.5 per cent by weight of styrene and 76.5 per cent of butadiene), and polyethylene, each in granular form, was pre-mixed by a tumbling action in the proportions stated in the following table and was sprayed with a solution of ethylvinylbenzene, divinylbenzene and raw linseed oil in the proportions and in amounts as stated in the table. The component starting materials of each composition were thoroughly blended by rolling and tumbling the same over a period of one hour at room temperature. The mixture was fed into a plastics extruder adapted for masticating, forwarding and discharge of the same, where it was heated to a temperature of from 175° C. to 190° C. as indicated in the table. The heat-plastified mass was mechanically worked by a masticating and forwarding action in the extruder over a period of about five minutes, was subjected to vacuum to remove volatile ingredients and was discharged through an extrusion die. The composition was cooled and cut into granular form suitable for molding. The product was a homogeneous resinous composition. Portions of the resinous product from each experiment were injection molded to form test bars of ⅛ by ⅛ inch square cross section. These test bars were used to determine the tensile strength in pounds per square inch of initial cross section and the impact strength in inch pounds of energy applied as a sharp blow to cause breakage of a test bar. Except for the shape and the dimensions of the test bars and the weight of the hammer used in measuring impact strength, the procedures used in determining tensile strength and impact strength were similar to those described in A. S. T. M. D638-49T and A. S. T. M. D256-43T, respectively. Other portions of each composition were injection molded to form test bars of ⅛ by ½ inch rectangular cross section. These test bars were used to evaluate the aging characteristics of the composition by determining the per cent of its original length by which a test bar could be elongated under tension before breakage occurred, both on test bars as originally molded and after exposure of test bars to ultraviolet light. The procedure used in aging the test bars was similar to that described in A. S. T. M. D795-49 for determining light stability, except that the test bars were exposed to the rays of an S-4 sunlamp for a period of 24 hours. Table I identifies each resinous composition by naming the ingredients from which it was prepared and gives the parts by weight of each ingredient in the composition. The table gives the temperature at which the ingredients were compounded together and gives the properties determined for each product. For purpose of comparison a composition of the polystyrene, the GRS rubber and the liquid ingredients, but omitting the polyethylene, was prepared and tested in the same way as just described.

Table I

| Run No. | Starting Materials | | | | | | Compounding Temp., °C | Properties of Products | | | |
|---|---|---|---|---|---|---|---|---|---|---|---|
| | Polystyrene, Parts | GRS X-274, Parts | Polyethylene, Parts | Ethylvinylbenzene, Parts | Divinylbenzene, Parts | Linseed Oil, Parts | | Tensile Strength, lbs./sq. in. | Impact Strength, in.-lbs. | Percent Elongation | |
| | | | | | | | | | | Original | After Aging 24 Hrs. |
| 1 | 87 | 7 | | 1.2 | 0.8 | 4 | 175 | 4,260 | 1.6 | 20.8 | 8.6 |
| 2 | 85 | 7 | 2 | 1.2 | .8 | 4 | 190 | 4,000 | 1.9 | 38.5 | 20.8 |
| 3 | 85 | 7 | 3 | 1.2 | .8 | 3 | 190 | 4,320 | 1.8 | 28.9 | 19.5 |
| 4 | 85 | 7 | 4 | 1.2 | .8 | 2 | 185 | 4,630 | 1.5 | 26.3 | 15.6 |
| 5 | 82 | 7 | 6 | 1.2 | .8 | 3 | 180 | 4,380 | 1.4 | 29.2 | 20.3 |

EXAMPLE 2

A charge of 16 pounds of molding grade polystyrene in granular form, 2.2 pounds of ground GRS type X-274 synthetic rubber, and 0.6 pound of granular polyethylene was blended together and mixed with a solution of 0.24 pound of ethylvinylbenzene, 0.16 pound of divinylbenzene and 0.8 pound of raw linseed oil by tumbling the ingredients at room temperature over a period of about one hour. The mixture was fed into an extruder and masticated at a heat-plastifying temperature of 180° C. over a period of 5 minutes by procedure similar to that described in Example 1, to form a homogeneous mass, and was discharged through an extrusion orifice. The resinous product was cooled and crushed to a granular form. The properties of the composition were determined as described in Example 1. A similar composition (B), was made from 16.6 pounds of the polystyrene, 2.2 pounds of the GRS type X-274 rubber, 0.24 pound of ethylvinylbenzene, 0.16 pound of divinylbenzene and 0.8 pound of raw linseed oil and its properties determined in the same way as just described. The properties of the respective compositions were found to be:

| | A | B |
|---|---|---|
| Tensile Strength, lbs./sq. in. | 3,150 | 4,020 |
| Impact Strength, in.-lbs. | 1.6 | 2.0 |
| Percent Elongation (original) | 25.8 | 38.3 |
| Percent Elongation (after aging 24 hrs.) | 22.7 | 4.2 |

EXAMPLE 3

A mixture of 17.5 pounds of molding grade polystyrene, 1 pound of GRS type X-274 rubber, and 0.6 pound of polyethylene, each in granular form, was blended with a solution of 0.24 pound of ethylvinylbenzene, 0.16 pound of divinylbenzene and 0.6 pound of raw linseed oil by tumbling the mixture at room temperature. The mixture was fed into an extruder and masticated at a heat-plastifying temperature of 175° C. over a period of about 7 minutes to form a homogeneous mass and was discharged through an extrusion orifice. It was cooled and cut to a granular form. Portions of the composition were injection molded to form test bars and the properties of the composition determined as described in Example 1. The composition had the following properties:

| | |
|---|---|
| Tensile strength | 4340 lbs./sq. in. |
| Impact strength | 1.6 in.-lbs. |
| Elongation (original) | 36.7 per cent |
| Elongation (after aging 24 hrs.) | 15.6 per cent |

The composition can readily be extruded to form articles having a smooth glossy surface.

By way of comparison a thermoplastic composition prepared by polymerizing a solution of 93 per cent by weight of styrene, 5 per cent of GRS type X-274 rubber, one per cent of norbutyl stearate and one per cent of white mineral oil, and thereafter milling the polystyrene-rubber mix on heated compounding rolls to obtain a uniform mass, was injection molded to form test bars of 1/8 by 1/2 inch rectangular cross section. These test bars were used to evaluate the aging characteristics of the composition by determining the per cent elongation value for test bars as originally molded and after exposure of test bars to rays of an S-4 sunlamp over a period of 24 hours as described in Example 1. The composition had an original per cent elongation value of 31.4 per cent, but after exposure to rays of the S-4 sunlamp for a period of 24 hours the per cent elongation value was only 6.5 per cent.

Other modes of applying the principle of the invention may be employed instead of those explained, change being made as regards the steps or ingredients herein used, provided the steps or the ingredients stated in any of the following claims or the equivalent of such steps or ingredients be employed.

We claim:

1. The method of making a thermoplastic composition composed principally of a polymerized monovinyl aromatic hydrocarbon and a rubbery copolymer of styrene and butadiene, which comprises blending from 75 to 90 parts by weight of a resinuous polymer of a monovinyl aromatic hydrocarbon having the vinyl group as the sole non-aromatic unsaturation, from 5 to 12 parts of a rubbery copolymer of from 50 to 80 per cent by weight of butadiene and from 50 to 20 per cent of styrene, from 2 to 6 parts of a solid polyethylene and from 3 to 7 parts of a liquid mixture of polymerizable vinyl aromatic hydrocarbons and a drying oil, into a homogeneous mass by masticating a mixture of the ingredients at a heat-plastifying temperature between 160° and 220° C. for a time of from 3 to 15 minutes to form a homogeneous composition.

2. The method of making a thermoplastic composition composed principally of a polymerized monovinyl aromatic hydrocarbon and a rubbery copolymer of styrene and butadiene, which comprises blending from 75 to 90 parts by weight of a resinous polymer of a monovinyl aromatic hydrocarbon having the vinyl group as the sole non-aromatic unsaturation, from 5 to 12 parts of a copolymer of from 70 to 80 per cent by weight of butadiene and from 30 to 20 per cent of styrene, from 2 to 6 parts of a solid polyethylene, and from 3 to 7 parts of a liquid mixture of a polymerizable vinyl aromatic hydrocarbon and a drying oil, into a homogeneous mass by masticating a mixture of the ingredients at a heat-plastifying temperature between 160° and 220° C. for a time of from 3 to 15 minutes to form a homogeneous composition.

3. The method of making a thermoplastic composition composed principally of a polymerized monovinyl aromatic hydrocarbon and a rubbery copolymer of styrene and butadiene, which comprises blending from 75 to 90 parts by weight of polystyrene, from 5 to 12 parts of a copolymer of from 70 to 80 per cent by weight of butadiene and from 30 to 20 per cent of styrene, from 2 to 6 parts of a solid polyethylene, and from 3 to 7 parts of a liquid mixture of a vinyl aromatic hydrocarbon and a drying oil, into a homogeneous mass by masticating a mixture of the ingredients at a heat-plastifying temperature between 160° and 220° C. for a time of from 3 to 15 minutes to form a homogeneous composition.

4. The method as described in claim 3, wherein the vinyl aromatic hydrocarbon is divinylbenzene.

5. The method as described in claim 3, wherein the vinyl aromatic hydrocarbon is divinylbenzene and the drying oil is linseed oil.

6. The method of making a thermoplastic composition composed principally of a polymerized monovinyl aromatic hydrocarbon and a rubbery copolymer of styrene and butadiene, which comprises blending from 75 to 90 parts by weight of polystyrene, from 5 to 12 parts of a copolymer of from 70 to 80 per cent by weight of butadiene and from 30 to 20 per cent of styrene, from 2 to 6 parts of a solid polyethylene, and from 3 to 7 parts of a liquid mixture consisting of from 10 to 25 per cent by weight of divinylbenzene, from 20 to 50 per cent of ethylvinylbenzene and from 25 to 70 per cent of linseed oil, into a homogeneous mass by masticating a mixture of the ingredients at a heat-plastifying temperature between 160° and 220° C. for a time of from 3 to 15 minutes to form a homogeneous composition.

7. A thermoplastic composition suitable for molding consisting of a homogeneous mixture of from 75 to 90 parts by weight of a hard resinous polymer of a monovinyl aromatic hydrocarbon having the vinyl group as the sole non-aromatic unsaturation, from 5 to 12 parts of a rubbery copolymer of from 50 to 80 per cent by weight of butadiene and from 50 to 20 per cent of styrene, from 2 to 6 parts of a solid polyethylene and from 3 to 7 parts of a liquid mixture of from 5 to 95 per cent by weight of polymerizable vinyl aromatic hydrocarbons and from 95 to 5 per cent of a drying oil, the said mixture of ingredients being heat-plastified and masticated at temperatures between 160° and 220° C. to polymerize at least a portion of the liquid ingredients and form a homogeneous composition.

8. A thermoplastic composition suitable for molding consisting of a homogeneous mixture of from 75 to 90 parts by weight of polystyrene, from 5 to 12 parts of a rubbery copolymer of from 50 to 80 per cent by weight of butadiene and from 50 to 20 per cent of styrene, from 2 to 6 parts of a solid polyethylene and from 3 to 7 parts of a liquid mixture of ethylvinylbenzene, divinylbenzene and a drying oil, the said mixture of ingredients being heat-plastified and masticated at temperatures between 160° and 220° C. to polymerize at least a portion of the liquid ingredients and form a homogeneous composition.

WALTER E. DONALDSON.
ALDEN W. HANSON.

No references cited.